Feb. 20, 1973

P. J. AUBRIER 3,717,417

ROTARY TOOL-CARRYING HEADS FOR MACHINE TOOLS

Filed July 27, 1970

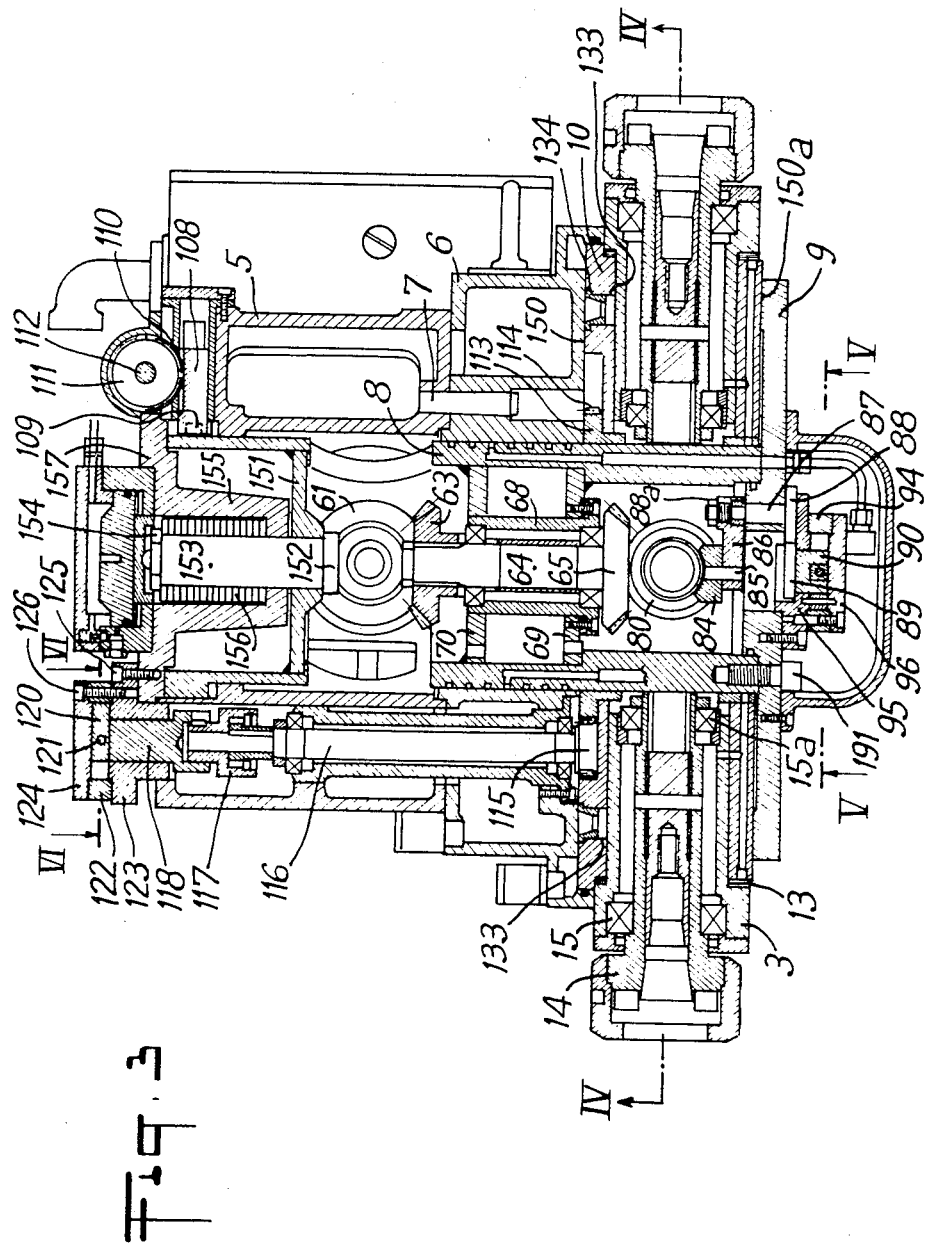

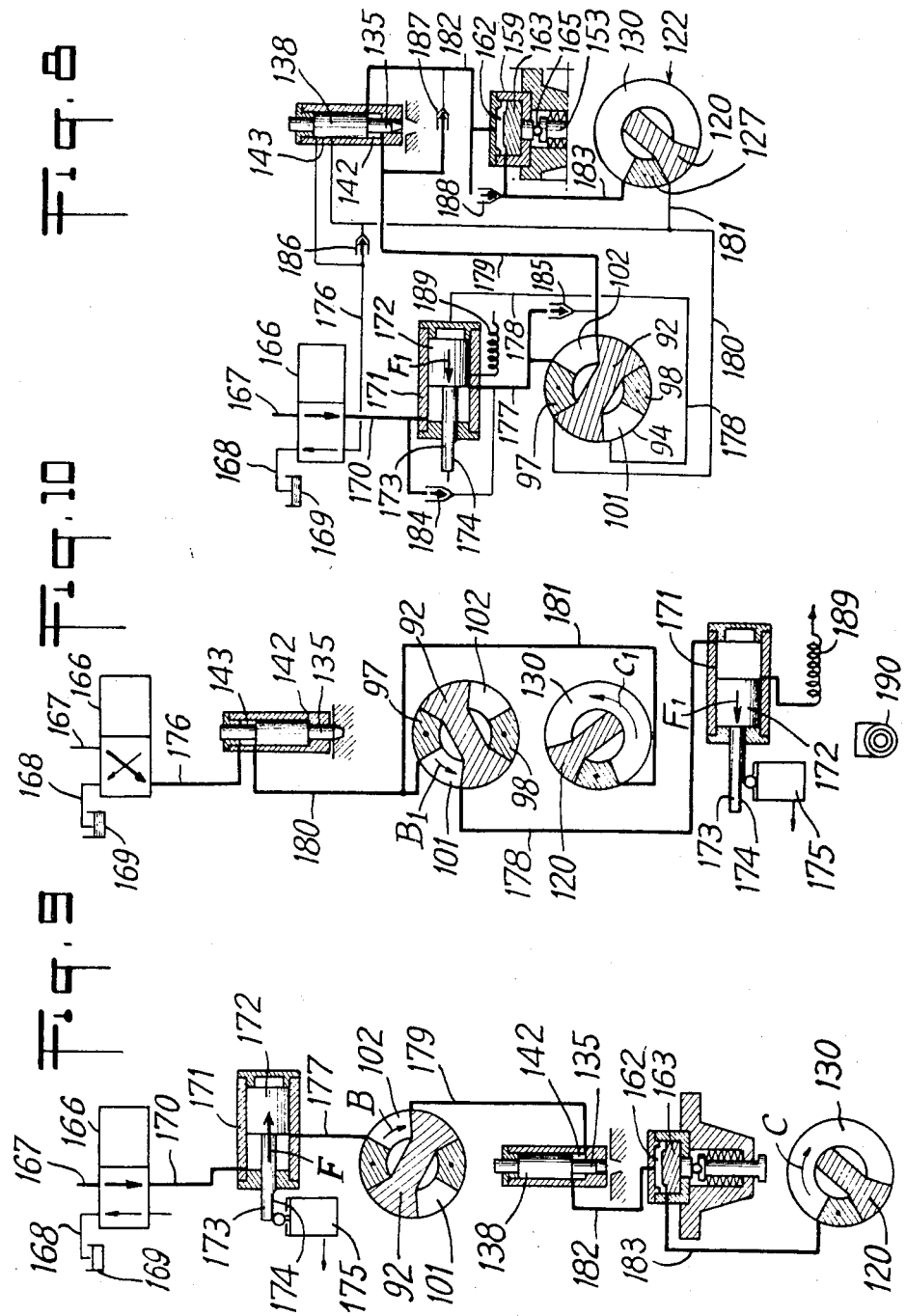

United States Patent Office 3,717,417
Patented Feb. 20, 1973

3,717,417
ROTARY TOOL-CARRYING HEADS FOR MACHINE TOOLS
Paul Jacques Aubrier, Le Havre, France, assignor to Societe Anonyme dite: CNMP-Berthiez, Paris, France
Filed July 27, 1970, Ser. No. 58,575
Claims priority, application France, Aug. 8, 1969, 6927430
Int. Cl. B23b 39/20
U.S. Cl. 408—35     7 Claims

ABSTRACT OF THE DISCLOSURE

A rotary head for use in a machine tool, for example, a milling and boring machine, includes a turret having a plurality, for example eight, tool-carrying spindles. The turret is rotatably mounted on a body of the head through the intermediary of a cylindrical casing which houses drive means for the turret. The turret is indexed angularly and as each spindle is stopped in its working position, a locking device comes into action and a slidable drive shaft engages the selected spindle and drive can be commenced. The turret motion is controlled by hydraulic actuators.

BACKGROUND OF THE INVENTION (1) Field of the invention

The present invention relates to rotary heads of machine tools.

(2) Description of the prior art

Machine tools for carrying out repetitive machining operations, particularly milling, boring, drilling or taping, comprise, in general, a rotary head forming an integral part of the machine.

Conventional machines are also used, particularly milling and boring machines, on which can be detachably mounted a rotary head.

The rotary head comprises, in known manner, a number of tool-carrying spindles arranged in a common plane, which are presented successively by rotation, in their working position.

This single, generally vertical position makes necessary the definition of a corresponding single position for the part to be machined, which may be disadvantageous with regard to certain shapes, to rigidity, to clamping, to the removal of swarf and with regard to the control of dimensions.

There are also fairly frequent cases in which machining operations must be carried out in several planes on a single workpiece.

With a conventional rotary head, it is necessary to operate on the workpiece in several different positions, which give rise to a substantial loss of time, particularly if the machining operations in different planes are related to an exact reference point.

An object of the present invention is to overcome these disadvantages.

SUMMARY OF THE INVENTION

According to the present invention, there is provided a machine tool rotary head comprising a turret pivotably mounted on a body arranged to be secured to one of the parts of a machine tool and comprising a plurality of tool spindles each capable of receiving one tool, and a casing coaxial with the turret and interposed between the turret and the said body on which it is rotatably mounted, the casing containing drive means which can be coupled selectively with one of the tool spindles following angular displacement of the casing to a selected position.

BRIEF DESCRIPTION OF THE DRAWINGS

An embodiment of a rotary head in accordance with the invention of a machine tool will now be described with reference to the accompanying diagrammatic drawings, in which:

FIG. 3 is a section of the rotary head on the line III—III of FIG. 1;

FIG. 8 is a diagram of a hydraulic control circuit of the rotary head;

FIG. 9 is a diagram of a hydraulic circuit when the turret is in a transfer position;

FIG. 10 is a diagram of the hydraulic circuit when the turret is in its locked position.

DESCRIPTION OF THE PREFERRED EMBODIMENT

Figure 1:
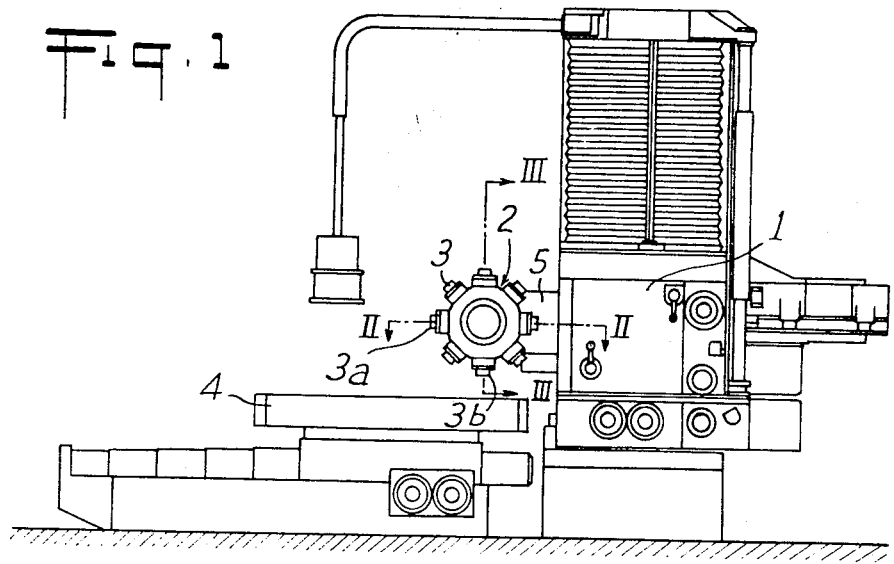
FIG. 1 is an elevation of a milling and boring machine with a movable table and equipped with a rotary head in accordance with the invention.

In FIG. 1 a horizontal milling and boring machine is shown, transversely movable on a bed combined with a workpiece-carrying table movable longitudinally on another bed.

The milling and boring machine comprises a head-stock 1 which is provided with a rotary head 2, in accordance with the invention, comprising eight carrying spindles 3 capable of being used in different working positions, in particular in a horizontal position 3a or vertical position 3b.

The working feed movements of the horizontal tool carrying spindle 3a are obtained by longitudinal displacement of the table 4 and the feed movements of the vertical tool carrying spindle 3b are effected by vertical displacement of the head-stock 1.

Figure 4:
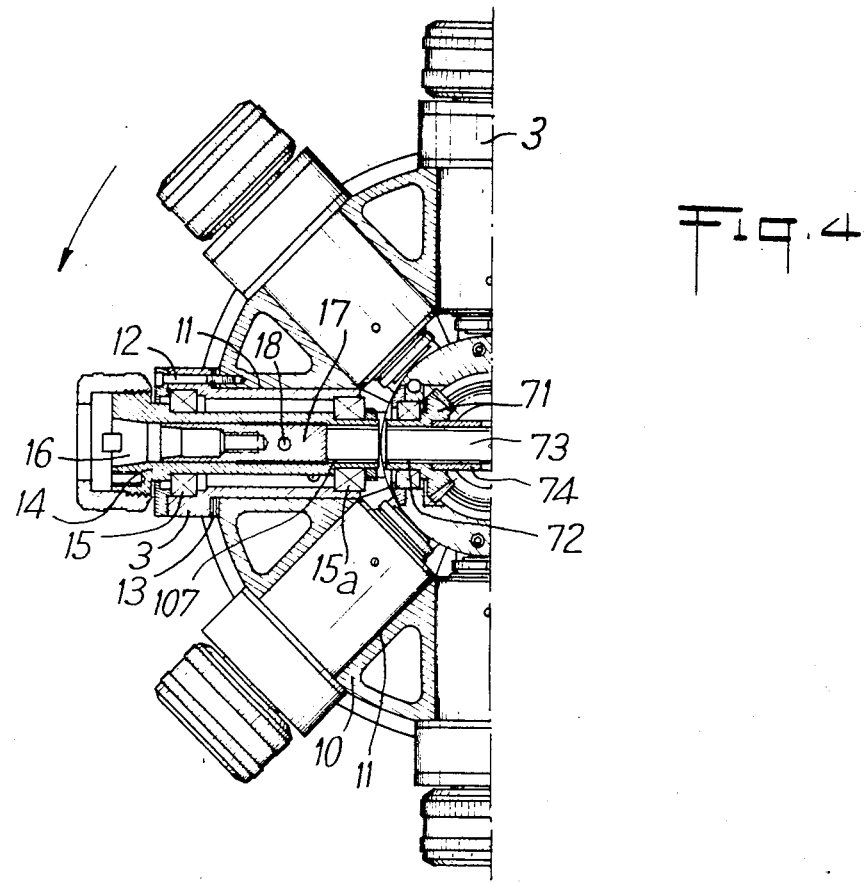
FIG. 4 is a section of one-half of the rotatable head on the line IV—IV of FIG. 3.
Figure 2:
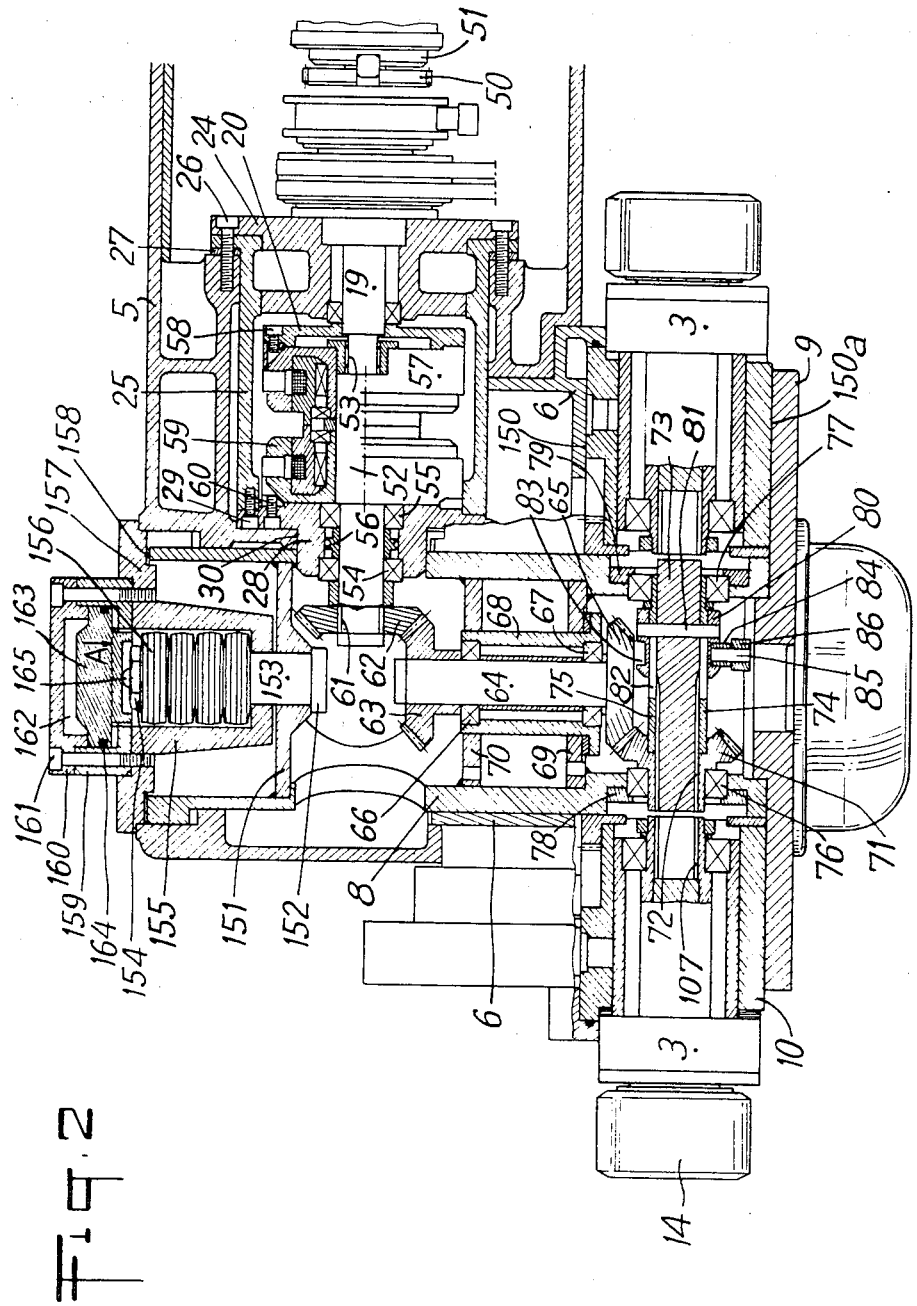
FIG. 2 is a section of the rotary head on the line II—II of FIG. 1.

In FIGS. 2 to 4 a rotary head 2 in accordance with the invention is illustrated in the particular case where the latter is detachably mounted on the head-stock 1.

The rotary head comprises a body in two parts 5 and 6, which are connected together by screws, not shown in the drawing, and a tapered gudgeon pin 7, the body being fixed by the part 5 on the main frame of the machine.

A cylindrical casing 8 is pivotally mounted in the parts 5 and 6 carrying at one of its ends a plate 9 held by means of screws 191 on the casing 8.

Between the part 6 of the body and the plate 9 of the casing 8 a turret 10 is rotatably coaxially mounted with respect to the casing having bores 11, in which are removably mounted by means of screws 12, carrying-spindles 3 with the interposition of a spacer 13 of adjustable thickness.

In the interior of each of the carrying-spindles 3 a rotatable spindle is mounted by means of ball bearings 15, 15a and has therein a cone 16 for securing a tool and which is formed, in part, in the spindle 14 and in part on a related part 17 secured by means of a pin 18.

The drive of each of the spindles 14 is effected by a kinematic chain (FIGS. 2 and 11) which comprises a shaft 19 carrying at one end a flange 20 and journalled in two bearings 21, 22, located in a housing 24 engaged in one of the ends of a casing 25 secured by means of screws 26 on the part 5 of the body, with the interposition of an adjusting shim 27.

At its other end, the casing 25 is closed by a cap 28 engaged in a bore 30 of the body and is secured by means of screws 29 to the casing 25. Sealing of the bearings 21 and 22 is effected by a seal 31 held between a cover 32 and a spacer 33.

A grooved pulley 34, engaged by trapezoidal (V) belts 35, is keyed on a hub 36 which serves to mount bearings 37, 38 which journal the shaft 19.

The shaft 19 has splines 39 on which the hub 40 with teeth 41 on the periphery and the bearings 21, 22, 37, 38, are held on the shaft 19 by a nut 42 and a lock washer 43. An internally toothed sleeve 44 having an annular groove 45 is mounted on the hub 40 in which groove is engaged a finger 46 carried by a pin 47 on which it can turn freely.

The pin 47 is rigid with a control fork 48, capable of being actuated by any known means, in order to effect displacement of the sleeve 44 as indicated by the double-headed arrow F, which sleeve can engage a toothed part 49 of the hub 36, thus enabling the shaft 19 to be driven by the pulley 34 which is connected by the belts 35 to the head-stock shaft of the drilling-reaming machine and is driven directly from the motor of the spindle of the said head-stock in a range of high rotation speeds.

Figure 11:
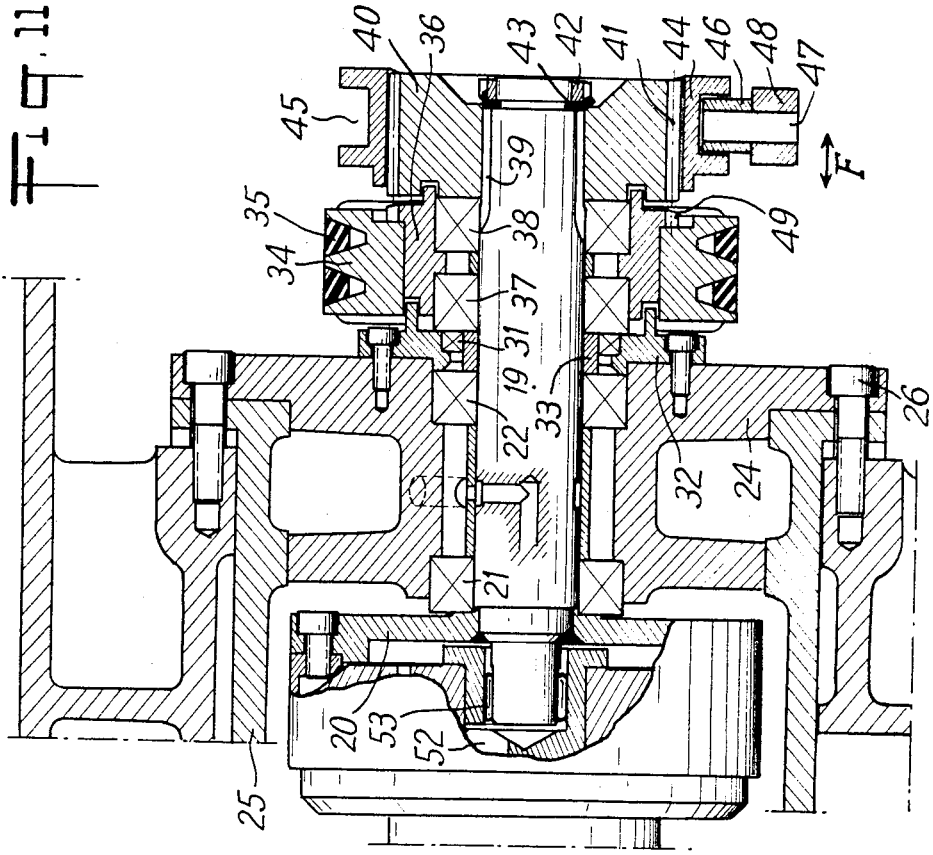
FIG. 11 is a section, to an enlarged scale, of a part of drive mechanism of the spindles.
Figure 7:
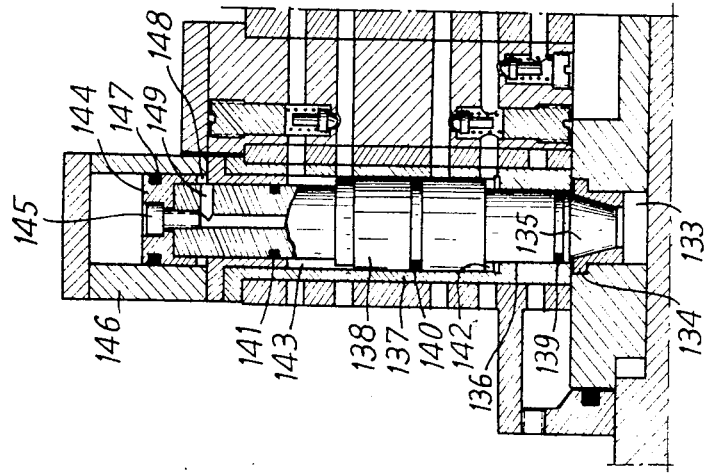
FIG. 7 is a view, to an enlarged scale, of a locking device for the turret.

The sleeve 44 can be displaced as indicated by the double-headed arrow F towards the right (as shown in FIG. 11), in order to engage a toothed part 50 of a coupling device rotationally driven by a drilling spindle 51 in a low speed range.

Another shaft 52 is located in the extension of the shaft 19, which is supported by the latter at one of its ends through the intermediary of a needle roller bearing 53 and at its other end in the housing 28 of the casing 25 by two bearings 54, 55, of which the operational spacing is controlled by a rotatable spacer 56.

The shaft 52 carries an electromagnetically-controlled clutch 57 having multiple discs and which clutch is secured on the flange 20 by screws 58. The shaft 52 also carries a friction brake 59 with multiple discs and electromagnetic control which is secured on the cover 28 of the casing 25 by screws 60 and by other securing means not shown in the drawing.

On the end portion of the shaft 52 opposite to the flange 20 having grooves 61, there is mounted a bevel gear 62 having spiral cut teeth with which it engages with a bevel gear 63 keyed on a shaft 64 which carries a corresponding bevel gear 65 at the other end.

The shaft 64, which is located with its axis perpendicular to the axis of the shaft 52, is journalled by means of bearings 66 and 67, carried by the housing 68 which is mounted by spacers 69 and 70 in the casing 8.

The bevel gear 65 meshes with a bevel gear 71 having an internally splined bore which engages corresponding splines 72 of a shaft 73 of which the axis is perpendicular to the axis of the shaft 64, and which is slidably mounted in a spacer sleeve 74 supported on the one part by the gear wheel 71 by a precision arrangement 75 and on the other part by the shaft 73.

The shaft 73 is slidably mounted with respect to the carrying spindle 3 according to the position of the casing 8 and of the turret 10, and is engageable by the splines 72 in a corresponding splined bore 107 provided in one end of the spindle 14.

The displacement of the shaft 73 from the position in which it is arranged to be driven with the shaft 14 to the position of disengagement shown in FIGS. 2 and 4, is effected by the device which will be described hereinafter. The assembly constituted by the shaft 73 and the sleeve 74, is journalled by two bearings 76 and 77 mounted in the casing 8 and held in place by covers 78 and 79.

A ring 80 is slidably mounted on the sleeve 74 on which ring is riveted a pin 81 pressed into the shaft 73 and capable of sliding in slots 82 provided in the sleeve 74 in such a manner as to drive the shaft 73 in translation.

The ring 80 has an annular groove 83 in which a finger 84 engages which is pivotally mounted on a pin 85 fixed on a yoke 86 (FIGS. 2 and 3) which is keyed to one of the ends of a pin 87 and held thereon by a nut 88a.

Figure 5:
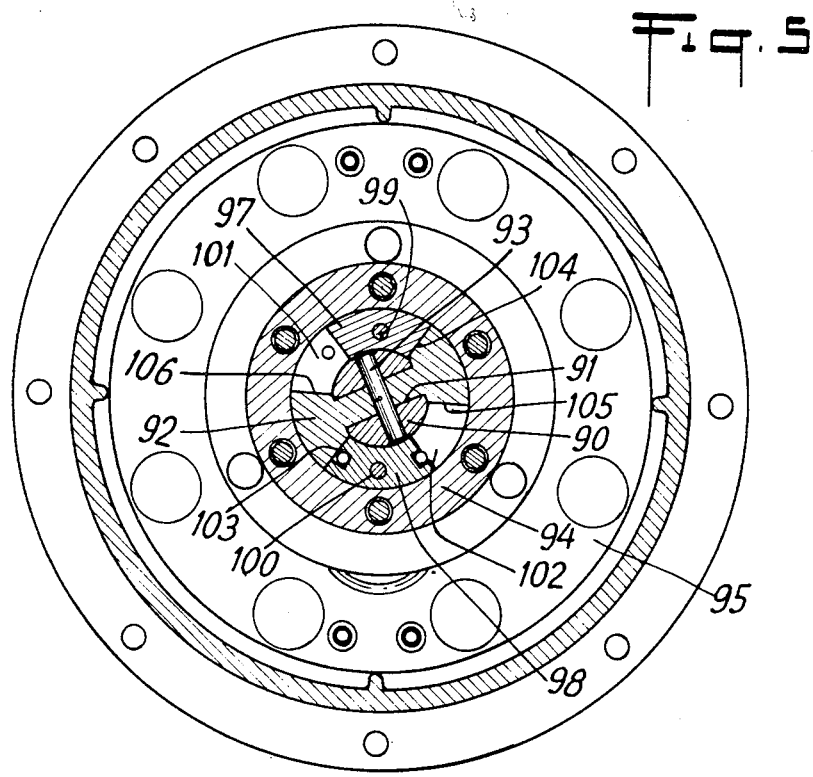
FIG. 5 is a section on the line V—V of FIG. 3, of a hydraulic motor controlling the drive shaft of the spindles.

The pin 87 carries a pinion 88 at its other end which meshes with a pinion 89 of which the straight shank 90 (FIG. 5) has a slot 91 in which is engaged a double-ended blade 92 locked to the shank by a pin 93.

This member 92 is rotatably mounted in a cylinder 94 which is centered on a seating 95 and closed by a cover 96.

Two stop members 97, 98 are arranged within the cylinder 94 secured to the seating 95 and to the cover 96 by pins 99 and 100, the stop members 97, 98 forming within the cylinder 94 two fluid chambers 101, 102 of variable volume according to the angular position of a double-ended blade 92 which is rotatably displaced in dependence on the manner in which it receives fluid pressure, either on faces 103, 104 or on the faces 105, 106.

This kinematic chain makes possible the transmission of rotational movement from the shaft 19 to the shaft 73, to drive rotationally any one of the spindles 14, whatever the angular position of the sliding shaft 73 which is integral with the casing 8 capable of pivoting with respect to the body 5, 6 and to the turret 10, in order to bring the shaft 73 into drive relationship with any one of the spindles 14 for a predetermined position of the turret 10.

These positions of the casing 8 are determined by means of a pin 108 which has an inclined face which enables it to provide by its engagement in a notch 109 of the casing 8, a location without play of the casing 8 and with high precision by the use of a shim of appropriate thickness.

The casing 8 may have more notches 109 than there are spindles 14 on the turret 10. The casing 8 may contain as many notches 109 as necessary to obtain the desired tooling position of the spindle 14 on the turret 10.

The pin 108 which is slidably mounted in the body 5, has on one of its faces a rack 110 which is in mesh with a pinion 111 keyed on a shaft 112 which can be actuated by any known means and in particular by a crank, so that the pin 108 in one of the notches 109 can be driven in rotation by the pinion 111 and the rack 110.

The turret is provided with appropriate rotational drive means and means for locking it in its working position.

Figure 6:
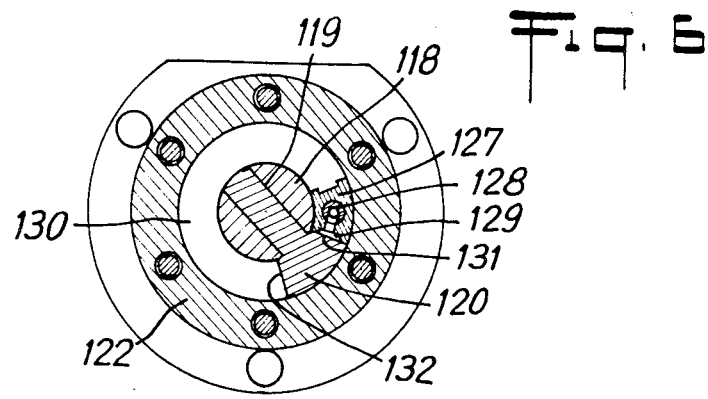
FIG. 6 is a section on the line VI—VI of FIG. 3, of a hydraulic control device of the turret.

For the rotational drive of the turret, the latter is rigid with a ring 113 rotatably mounted on the casing 8 and having a ring of teeth 114 which is engaged with a pinion 115 at one of the ends of the shaft 116 of which the other end is coupled through the intermediary of a one-way clutch 117 with a sleeve 118 which has at one of its ends a slot 119 (FIGS. 3 and 6), in which is engaged a blade 120 retained by a pin 121.

It can therefore be seen that by using the free wheel 117 the vane 120 after rotation returns to the starting position without activating the turret 10.

This blade can rotate freely within a cylinder 122 centered on a flange 123, secured on the body by bolts 125 and closed by a cover 124 secured to the cylinder 122 by bolts 126.

Within the cylinder 122 a stop member 127 is located which is connected with the flange 123 and with the cover by a pin 128.

This stop member 127 defines two fluid chambers 129 and 130, of variable volume according to the angular position of the blade 120 which is subjected to fluid pressure action, either on its face 131 or on its face 132.

As a result of angular displacement, the blade 120 acts through the intermediary of the one-way clutch 117 on the pinion 115 and on the pinion gear 114 in order to drive the turret 10 through an angular displacement equal to 45 degrees thus making possible the successive offering-up of the carrying spindles 3.

With regard to the turret locking means, there is provided on said turret for each carrying spindle 3, an aperture 133 in which is mounted a socket 134 preferably of treated (hardened) steel, in which the end of a stepped pin 135 can be engaged, the stepped pin being guided in bores 136 and 137 of a sleeve member.

A central part 138 of the stepped pin acts as a distribution means for carrying out an automatic cycle of operation such as will be described hereinafter.

Annular seals 139, 140, 141 ensure sealing of various fluid chambers, such as 142 and 143, the fluid in which acts on the pin 135 in order to cause the latter to slide and to cause engagement in and disengagement from the socket 134.

At one of its ends, the stepped pin 135 carries a piston 144 secured by a screw 145, the piston being slidable in a cylinder 146. The piston is sealed by an annular seal 147.

Fluid admitted into an annular space 148 through ports 149 creates a counter pressure tending to brake the assembly which prevents forced introduction of the stepped pin 135 into the socket 134.

In the machining position, when the stepped pin 135 is engaged in one of the sockets 134, the turret 10 is held between the faces 150, 150a of the body 6 and of the plate 9 respectively.

For this purpose, the cylindrical casing 8 is provided at its part opposite to that supporting the turret 10 with a plate 151 on which is supported a head 152 of a tension rod 153 provided at its other end with a screw 154.

Between the head of the screw 154 and the bottom of a housing 155 a stack of resilient spring steel washers 156 is interposed, the housing 155 being supported by a flange 157 on the body 5. This arrangement biases the cylindrical casing 8 and the plate 9 to retract, thus annulling the operational rotational play of the turret 10 and causing a locking action by reaction of the faces 150, 150a of the body 6 and of the plate 9 respectively.

This retraction movement of the casing 8 is made possible by the provision of a clearance 158 between the casings 8 and 155.

A cylinder 159 and its head 160 are secured by means of screws 161 to the casing 155 which together define a fluid chamber disposed above a piston 163 provided with an annular fluidtight seal 164 and slidably mounted in the cylinder 159, the piston being supported on the head of the bolt 154 by a ball 165.

Under the action of fluid pressure which is introduced into a chamber 162, the piston 163 is displaced in the direction of the arrow A, so that it acts through the intermediary of the ball 165 on the head of the member 154 in opposition to the force exerted by the resilient washers 156 and thereby returns the pin 153 likewise in the direction of the arrow A thus axially freeing the casing 8 and the turret 10 for rotation which is no longer held locked between the support faces 150, 150a.

The control of the various members of the rotary head is effected by a hydraulic circuit shown diagrammatically in FIGS. 8, 9 and 10.

The hydraulic circuit comprises a remotely-controlled solenoid valve 166, associated with the miller-borer which is connected on the one hand by a pipe 167 to a source of fluid under pressure and by a pipe 168 to a supply reservoir 169 for the hydraulic circuit.

On the other hand, the solenoid valve 166 communicates through a pipe 170 to a cylinder 171 of the control device, in which a piston 172 is displaceable. A piston rod 173 extends externally of the cylinder and has a flat 174 cooperating with a two-way switch with a ball 175, the solenoid valve also communicating through a pipe 176 with the annular chamber 143 of the actuator 138 of the stepped pin 135.

The central part of the cylinder 171 is connected by a pipe 177 to one of the chambers 102 of the cylinder 94 for controlling the spindles and to a hydraulic resistance 189 provided for lubrication.

The end of the cylinder 171 opposite to the outlet of the pipe 170, communicates through a pipe 178 with the other chamber 101 of the cylinder 94 for controlling the spindles.

The chamber 102 of the cylinder 94 communicates at its centre through a pipe 179 with the annular chamber 142 of the pin 135 of the turret and the chamber 101 communicates through a pipe 180 with the annular chamber 143 of the pin 135 and by a pipe 181 with the chamber 130 of the cylinder 122 for controlling the rotation of the turret. Finally, the chamber 142 of the pin 135 communicates through a pipe 182 with the chamber 162 of the unlocking device of the turret which communicates through a pipe 183 with the chamber 130 of the cylinder 122 for controlling the rotation of the turret.

Valves 184, 185, 186, 187 and 188 are arranged in shunt passages between the different pipes, in order to ensure the operation in the two cases described hereafter.

Assuming that the rotary head is in its working position, that is to say when the turret 10 is locked and that one of the spindles 14 is being driven by the shaft 73 which is engaged in the splines 107 of the spindle, the control of the solenoid valve 166 is actuated in order to bring it into the position shown in FIG. 9.

The pipe 170, connected to the pipe 167 associated with the source of fluid under pressure, supplies the cylinder 171, so that the piston 172 is driven in the direction of the arrow F and so that the flat 174 of the piston rod 173 comes into contact with the roller of the switch 175 which actuates the braking member 57, then the clutch member 59 in order to ensure that the shaft 52, the shaft 73 and the spindle 14 are stopped.

As soon as the piston arrives at the end of its stroke, as indicated in FIG. 9, it uncovers the opening of the pipe 177 which then supplies the chamber 102 with fluid under pressure, so as to drive the double blade 92 in the direction of the arrow B which actuates the shaft 73 through the lever 85 and the sleeve 80 in order to bring the shaft 73 into the disengaged position, that is out of engagement with the splines 107 of the spindle 14.

When the blade 92 takes up the position as shown in FIG. 9, it uncovers the opening of the pipe 179 which supplies the annular chamber 142 and causes the raising of the pin 135 which is thus disengaged from the socket 134 and so unlocks the turret 10.

At the end of the stroke of the member 138, the pipe 182 connects the annular chamber 142 to the chamber 162, so that the piston 163 can act in opposition to the resilient washers 156 in order to unlock the turret 10 which is thus freed for rotation and again supplies the chamber 130 of the device for controlling the rotation of the turret.

The blade 120 is rotated in the sense of the arrow C thus effecting drive through the free wheel 117 of the pinion 115 and of the pinion gear 113 of the turret 10 through an angular displacement of 45°, in order to bring opposite the spindle 73 another spindle 14.

The return of the fluid contained in the opposite chamber of the piston 172 is effected through the pipe 178, the space 101, the pipe 180, the annular space 143, the pipe 176 and the solenoid valve 166 to the reservoir 169.

When the turret is brought to a new position corresponding to the use of a fresh tool-carrying spindle, actuation of the solenoid valve 166 (FIG. 10) provides a pressure-fluid supply through the pipe 176 to the annular space 143 above the member 138, in order to actuate the latter and to engage the stepped pin 135 in one of the sockets 134 of the turret.

At the end of its stroke, the member 138 uncovers the opening of the pipe 180 which then supplies fluid under pressure to the chamber 101 in order to actuate the blade 92 which is driven in the direction of the arrow $B_1$ and controls the displacement of the shaft 73 which is engaged in the splines 107 of the spindle 14 in the engaged position.

As soon as the blade 92 comes into contact with the stop 98, the pipe 178 connects the chamber 101 to the base of the cylinder 171, in order to return the piston 172 in the sense of the arrow $F_1$ which, by means of its rod 173 controls the two-way switch 175 which unlocks the clutch 59 and actuates a contact enabling the control of the clutch 57 by a push-button 190, in order to drive the shaft 52 and thus the shaft 73 which is engaged in the spindle 14.

During this time, the pipe 181 has brought the chamber 130 of the control device for rotation of the turret into communication with the pipe 180, in order to drive the blade 120 in the sense of the arrow $C_1$ into the position of FIG. 10.

The blade 120 being connected to the pinion 115 through the one-way clutch 117, the displacement of the blade has no effect on the pinion and on the turret.

After the stepped pin 135 has moved downwardly, the fluid in the annular space 142 is exhausted through the pipe 179, the pipe 177, the chamber of the cylinder 171, the pipe 170 and the solenoid valve 166 to the reservoir 169.

The fluid flows through the pipe 182, the valve 187, the pipe 179, the valve 185 and the same route described hereinbefore, the piston 163 returning under the action of the resilient washers (Belleville washers) which cause the locking of the turret 10 between the surfaces 150, 150a of the body and of the plate 9 respectively.

The fluid which is in the chamber 102 of the cylinder 94 is likewise exhausted through the pipe 177, as hereinbefore described.

When the blade 120 moves, the fluid leaving the chamber 130 is exhausted through the pipe 183, the valve 188, the pipe 182, the valve 187, the pipe 179, the valve 183 and the same common path as hereinbefore described.

Finally, the fluid in the cylinder 171 is exhausted first through pipe 170, then through solenoid valve 166, and then through pipe 168 to the reservoir 169. The valve 184 remains closed.

When the piston 172 arrives at the end of its stroke, it uncovers the opening to the hydraulic resistance 189 which communicates with the lubricating circuit of the device.

In order to effect a change in the working axis and to change the angular position of the shaft 73, the operations of unlocking the turret 10 and of declutching the shaft are carried out, according to the diagram of FIG. 9, the casing 8 is unlocked by driving the pinion 111 and disengaging the pin 108 from the selected notch 109.

Then the casing is moved in order to cause the latter to turn in the body 5, 6 and in order to bring the shaft 73 opposite another spindle 14 and the pin 108 is engaged in another notch 109 of the casing 8.

Then the solenoid valve 166 is actuated in order to lock the turret and engage the shaft 73 according to the operational mode shown in FIG. 10.

I claim:

1. In a rotary head for use in a machine tool a body arranged to be secured to one of the parts of a machine tool,
   a turret including
   a plurality of rotatable spindles each for receiving one machine tool,
   a casing serving to mount the turret rotatably on the body and incorporating therein, and
   drive means adapted to be coupled selectively with one of the rotatable spindles, said drive means comprising
   a first shaft adapted to be coupled with power means of the machine tool,
   a second shaft mounted coaxially with the casing,
   a first pair of bevel gears coupling the first and second shafts,
   a third, splined, shaft extending perpendicularly to the axis of said casing,
   a sleeve slidable on and rotatable with the third shaft,
   a second pair of bevel gears coupling the second shaft and the sleeve,
   ring means having an annular groove therein fast with the third shaft,
   lever means engaging in the groove of the ring means,
   a hydraulically-operated control member for actuating the lever means, and
   means defining a splined bore in each of said spindles at the end thereof remtoe from tool-carrying-end,
   the third, splined, shaft being selectively movable into or out of engagement with the bore of a selected spindle by the action of said lever means.

2. A rotary head according to claim 3, wherein said first shaft comprises:
   a first part,
   a second part,
   brake means,
   clutch means,
   said brake means and said clutch means serving to connect said first and second parts, and
   coupling means capable of selectively coupling the first part of the first shaft with a transmission member of the boring spindle of the machine tool or the headstock spindle of the machine tool.

3. In a rotary head for use in a machine tool a body arranged to be secured to one of the parts of a machine tool,
   a turret including
   a plurality of rotatable spindles each for receiving one machine tool,
   a casing serving to mount the turret rotatably on the body and incorporating therein
   drive means adapted to be coupled selectively with one of the rotatable spindles, said body having a bearing surface and the head further comprises
   a plate mounted at one end of a cylindrical casing and having a bearing surface,
   resilient biasing means disposed at the other end of the casing and acting between the casing and the body, and
   a hydraulic actuator arranged to oppose the bias of the resilient means,
   said turret being carried by said bearing surfaces of the casing and the body and being biased by said resilient means towards the bearing surface of the body.

4. In a rotary head for use in a machine tool a body arranged to be secured to one of the parts of a machine tool,
   a turret including
   a plurality of rotatable spindles each for receiving one machine tool,
   a casing serving to mount the turret rotatably on the body and incorporating therein
   drive means adapted to be coupled selectively with one of the rotatable spindles,
   said casing having a plurality of recesses, each recess being associated with one said tool-carrying spindle, so as to obtain the proper tooling position of said spindle, and
   a hydraulically-actuable locking member mounted in the body and arranged to engage in the recess of one of said tool-carrying spindle when said spindle is in its operational position.

5. In a rotary head for use in a machine tool,
   a body arranged to be secured to one of the parts of a machine tool,
   a turret including
   a plurality of rotatable spindles each for receiving one machine tool,
   a casing serving to mount the turret rotatably on the body and incorporating therein, drive means adapted to be coupled selectively with one of the rotatable spindles.

a ring gear fast for rotation with the turret, a pinion gear, a shaft carrying at one end thereof, the pinion gear, said pinion gear meshing with said ring gear, a one way clutch mounted at the other end of the pinion gear shaft, and a hydraulic motor which is coupled to the pinion gear shaft through the one-way clutch.

6. The rotary head of claim 5 wherein the cylinder of the hydraulic motor for controlling the connecting element of a slidable drive shaft, for revolving the turret and for unclamping said turret are connected by a hydraulic circuit, said circuit including a fluid-distribution slide member connected to a locking mechanism of said turret and a control member comprising a piston means activated by the passage of fluid, said piston means being provided with a sliding rod for controlling a switch means acting on the circuit of a brake means and a clutch means for driving a kinetic chain for transmitting movement to said spindles, said control member being connected to a hydraulic resistance which is part of a lubricating circuit of the revolving head.

7. The rotary head of claim 5 wherein the cylinder of the hydraulic motor for controlling the connecting element of a slidable drive shaft, for revolving the turret and for unclamping said turret are connected by a hydraulic circuit, said circuit including a distribution slide member connected to a locking mechanism of said turret and a control member comprising a piston means activated by the passage of fluid, said piston means having a sliding rod for controlling a switch means acting on the circuit of a brake means and a clutch means for driving a kinetic chain for transmitting movement to said spindle, said control member being connected to a hydraulic resistance which is part of a lubricating circuit of the revolving head, whereby as the spindle is stopped in its working position the locking mechanism comes into action and the slidable drive shaft engages the selected spindle so that drive can be started.

References Cited
UNITED STATES PATENTS

| | | | |
|---|---|---|---|
| 3,203,071 | 8/1965 | Uchida | 408—35 X |
| 2,991,666 | 7/1961 | Charlat | 408—35 X |
| 2,685,122 | 8/1954 | Berthiez | 408—35 X |

FRANCIS S. HUSAR, Primary Examiner

U.S. Cl. X.R.

29—40